Patented Dec. 3, 1935

2,022,675

UNITED STATES PATENT OFFICE 2,022,675

AMMONIACAL COMPOSITION CONTAINING CALCIUM NITRATE, ITS PREPARATION, TRANSPORTATION AND USE

Walter H. Kniskern, Prince George County, Va., and Leonard V. Rohner, Syracuse, N. Y., assignors to Atmospheric Nitrogen Corporation, New York, N. Y., a corporation of New York No Drawing. Application January 21, 1933, Serial No. 652,924

8 Claims. (Cl. 71—9)

This invention relates to calcium nitrate-ammonia compositions, to processes for their preparation and to methods for the transportation of calcium nitrate and ammonia and the production of fertilizers employing ammoniacal solutions of calcium nitrate. The invention further relates to a transportable package containing a calcium nitrate-ammonia composition.

The methods for the fixation of atmospheric nitrogen in the form of ammonia make available large amounts of fixed nitrogen for industrial purposes, particularly for the production of fertilizers. The ammonia may be utilized as gaseous, liquid or aqua ammonia, or it may be oxidized to nitrogen oxides and these oxides absorbed in alkaline materials such as calcium carbonate or calcium hydroxide (milk of lime) to produce nitrate salts which are valuable constituents of fertilizer mixtures.

The marketing of ammonia in the form of liquid ammonia or of aqua ammonia is, however, attended by difficulties and expensive operations. The liquid ammonia has relatively high vapor pressures at ordinary temperatures requiring the use of high pressure equipment and necessitating precautions to prevent the loss of ammonia during shipment and use. If the ammonia is prepared in the form of aqua ammonia, on the other hand, the transportation and handling costs of the aqua ammonia are largely expended for the relatively large proportion of valueless water contained in the solution. Again, in producing calcium nitrate by the absorption of nitrogen oxides in calcium carbonate or milk of lime or by first absorbing the oxides as nitric acid and then reacting the nitric acid with a calcium base, the product formed is a solution of calcium nitrate from which the water must be evaporated in order to obtain the solid salt. The evaporation and solidification of solutions of calcium nitrate is difficult and expensive since the concentrated solutions of calcium nitrate are dehydrated only with difficulty and the liquid calcium nitrate obtained is a viscous material which readily super-cools before solidifying and, after solidifying, has the property of caking and avidly absorbing moisture from the atmosphere to form hydrates which make its transportation and storage difficult.

It is frequently desirable to prepare fertilizers containing nitrogen as well as $P_2O_5$ derived from phosphate materials such as superphosphate. It has been proposed to prepare such fertilizers by treating a monocalcium acid phosphate material such as superphosphate or triple superphosphate with ammonia. When the ammonia is added to the superphosphate in considerable amounts, however, it tends to cause water soluble and citrate soluble $P_2O_5$ in the superphosphate to be transformed into a citrate insoluble form which is not considered available as a plant food. There is, therefore, a limit in the amount of nitrogen which may be added to a superphosphate by means of basic ammonia without causing excessive reversion of the $P_2O_5$ and, for certain purposes, it is desirable to prepare fertilizers containing more nitrogen than may be practicably obtained by ammoniating a superphosphate.

It is accordingly an object of this invention to provide a composition of matter which comprises both calcium nitrate and ammonia suitable for use in the preparation of fertilizers and which contains the ammonia and calcium nitrate in a form advantageous for its transportation and handling. Another object of the invention is to provide a process for the preparation for transportation of ammonia and calcium nitrate, both of which are available at nitrogen fixation plants, which obviates many of the difficulties at present encountered in the preparation and transportation of these materials. It is a further object of this invention to provide a process for the production of phosphorous-nitrogen fertilizers containing a high proportion of nitrogen by treating a monocalcium acid phosphate material, for example, superphosphate or triple superphosphate, with a liquid composition comprising calcium nitrate and ammonia. Another object of this invention is to provide a composition of matter which comprises calcium nitrate, ammonia and urea which is advantageous for the transportation and the handling of these materials and for the production of fertilizers.

We have discovered that the solubility of calcium nitrate in water at temperatures of about 0° C. is but little affected as ammonia is introduced into the solution. Thus, water at 0° C. dissolves about an equal weight of calcium nitrate so that a saturated aqueous solution of calcium nitrate in water at this temperature contains about 50% $Ca(NO_3)_2$. As ammonia is introduced into the water it has but a relatively small effect upon the solubility of the calcium nitrate. Thus solutions of calcium nitrate, saturated at 0° C. in 30% aqua ammonia (a solution of ammonia in water containing 30% $NH_3$) contains about 47% $Ca(NO_3)_2$ and in 50% aqua ammonia contains about 50% $Ca(NO_3)_2$. As the concentration of the ammonia in the aqua ammonia is increased above 50%, there is but a small falling off in the solubility of the calcium nitrate. Thus, at 0° C. a saturated solution of calcium nitrate in 82% aqua ammonia (a solution of ammonia in water containing 82% NH₃) contains about 45% Ca(NO₃)₂, and anhydrous liquid ammonia saturated with calcium nitrate at 0° C. contains about 46% Ca(NO₃)₂.

The solutions of calcium nitrate in aqua ammonia which are substantially saturated at about 0° C. are advantageous as a means for the transportion of ammonia and calcium nitrate since they remain liquid without salting out a solid material under the influence of changing atmospheric temperature conditions ordinarily encountered or, if some precipitation should occur at extremely low temperatures such as might occur in the winter time, any precipitate formed may be redissolved upon a slight warming of the liquor. These solutions accordingly present no difficulties in their handling or addition to superphosphate materials by, for example, spraying them onto the superphosphate to obtain their thorough dissemination throughout the material. The solutions lend themselves readily to being sprayed through ordinary spraying devices without clogging of the sprayer by crystallization of solid material from the solutions under ordinary operating conditions. A further advantage of these solutions saturated at about 0° C. is that throughout the range of varying proportions of ammonia and water the amount of calcium nitrate dissolved in the solution remains substantially constant, and accordingly, the trade may be supplied with a liquor containing varying amounts of basic ammonia, in accordance with its requirements for the treatment of superphosphate, in which the percentage of calcium nitrate is substantially constant. Thus, uniformity in the addition of calcium nitrate to the superphosphate may be readily maintained as the requirements with respect to the addition of ammonia may be varied.

Not only the solutions of calcium nitrate in aqua ammonia which are substantially saturated at about 0° C. but also solutions containing more or less calcium nitrate have the advantage in their transportation and handling of relatively low vapor pressures as compared to ammoniacal liquids containing no calcium nitrate in solution. The presence of the calcium nitrate lowers the vapor pressure of the ammoniacal liquid to a marked extent, so that by dissolving calcium nitrate in an ammoniacal liquid which has vapor pressures materially above atmospheric at naturally prevailing temperatures, the vapor pressure at these temperatures may be substantially lowered. Thus, a solution of calcium nitrate in about 76% aqua ammonia and containing about 47% Ca(NO₃)₂ has vapor pressures of 1.6 and 4.3 atmospheres absolute at temperatures of 0° C. and 30° C., respectively, whereas an aqua ammonia of 76% NH₃ has vapor pressures of 3.1 and 8.4 atmospheres absolute at 0° C. and 30° C., respectively. Again, a solution of calcium nitrate in about 50% aqua ammonia containing 50% Ca(NO₃)₂ has vapor pressures at 0° C. of 0.4 atmosphere absolute and at 30° C. of 1.0 atmosphere absolute, whereas a 50% aqua ammonia containing no calcium nitrate has vapor pressures of 1.2 atmospheres absolute at 0° C. and 3.6 atmospheres absolute at 30° C.

The use of solutions of calcium nitrate in ammoniacal liquors as a means for the transportation and storage of calcium nitrate and ammonia obviates the difficulties arising in the marketing of solid calcium nitrate because of the property the solid salt has of absorbing moisture from the atmosphere and caking together when stored, which necessitates a disintegration of the caked mass before it may be utilized for the production of fertilizers. The liquid calcium nitrate-ammonia compositions, on the other hand, may be readily utilized in the treatment of solid fertilizer materials containing superphosphate by mixing the liquid with the solids, for example, by spraying the liquid onto the solid material while it is being agitated in a mixing machine. As noted above, it is preferred to employ solutions of calcium nitrate-ammonia which do not salt out at temperatures above about 0° C. since these solutions will not throw down a precipitate of solid material at ordinary temperatures or present difficulties in their use in spraying and mixing equipments.

We have further discovered that the solubility of calcium nitrate in ammoniacal solutions of either aqua ammonia or anhydrous liquid ammonia may be modified by the addition of urea to such solutions so that the solubility of the calcium nitrate is increased. Thus we have found that the following solutions may be prepared:

| Salting out temp. °C. | Composition—Wt. percent | | | | Ratio Lbs. Urea Lbs. NH₃ | Ratio Lbs. Ca(NO₃)₂ Lbs. NH₃ | Ratio Urea N+ Nitrate N NH₃-N | |
| --- | --- | --- | --- | --- | --- | --- | --- | --- |
| | Urea | Ca(NO₃)₂ | NH₃ | H₂O | | | | |
| Mol ratio of Ca(NO₃)₂ to H₂O approximately 1:2 | | | | | | | | |
| 4.0 | 36.5 | 0 | 63.5 | 0 | 0.57 | 0 | 0.33 | (1) |
| 4.0 | 0 | 47.5 | 42.1 | 10.4 | 0 | 1.13 | 0.23 | (2) |
| 4.0 | 25.7 | 40.6 | 24.9 | 8.8 | 1.03 | 1.63 | 0.92 | (3) |
| Weight ratio of NH₃ to H₂O approximately 1:1 | | | | | | | | |
| 0 | 0 | 50 | 25 | 25 | 0 | 2.00 | 0.41 | (4) |
| 0 | 12.0 | 51.2 | 18.2 | 18.6 | 0.66 | 2.81 | 0.95 | (5) |
| 0 | 30 | 35 | 17.5 | 17.5 | 1.71 | 2.00 | 1.39 | (6) |
| 0 | 37 | 0 | 31.5 | 31.5 | 1.17 | 0 | 0.66 | (7) |

The solutions in the above table, in which the mol ratio of calcium nitrate to water is approximately 1:2, represent solutions which may be prepared by adding Ca(NO₃)₂.2H₂O to anhydrous ammonia. It will be seen from Solution (2) above that by dissolving Ca(NO₃)₂.2H₂O in anhydrous liquid ammonia until the solution would salt out or form unstable super-cooled solutions at temperatures below about 4° C., 1.13 pounds of calcium nitrate, calculated as the anhydrous salt, would be dissolved for each pound of ammonia. By dissolving urea in the solution, however, Solution (3) shows that a liquid composition which does not salt out at temperatures above about 4° C. may be prepared containing 1.03 pounds of urea and 1.63 pounds of calcium nitrate, calculated as the anhydrous salt, for every 1 pound of ammonia. Thus, more $Ca(NO_3)_2.2H_2O$ may be dissolved in anhydrous ammonia when urea is added to the solution than when no urea is present. Solutions (4) and (5) show that, whereas a solution of anhydrous calcium nitrate in 50% aqua ammonia saturated at 0° C. contains 2 parts of calcium nitrate for every 1 part of ammonia, by dissolving urea in this solution additional calcium nitrate may be dissolved therein so that a solution saturated at 0° C. may be prepared containing 0.66 part of urea and 2.81 parts of calcium nitrate for every 1 part of ammonia.

Not only does the urea increase the solubility of calcium nitrate in ammoniacal solutions but conversely we have discovered that calcium nitrate increases the solubility of urea in such solutions. Thus, Solutions (1) and (3) of the above table show that, whereas a solution of urea in anhydrous liquid ammonia saturated at 4° C. contains 0.57 part of urea for every 1 part of ammonia, a solution containing 1.03 parts of urea for every 1 part of ammonia and which does not salt out at temperatures above about 4° C. may be prepared by dissolving urea and $$Ca(NO_3)_2.2H_2O$$

in liquid anhydrous ammonia. Again, Solutions (6) and (7) show that, whereas a solution of urea in 50% aqua ammonia saturated at 0° C. contains 1.17 parts of urea for every 1 part of ammonia, a solution containing 1.71 parts of urea for every 1 part of ammonia and which does not salt out at temperatures above about 0° C. may be prepared by dissolving urea and calcium nitrate in 50% aqua ammonia.

This mutual effect of urea and calcium nitrate upon the solubilities of each other in ammoniacal liquids makes it possible to prepare solutions of the two salts which contain large proportions of dissolved fertilizer ingredients. By employing these solutions for the treatment of superphosphate materials large amounts of nitrogen may be incorporated in the fertilizer mixtures without adding sufficient basic ammonia to cause excessive reversion of $P_2O_5$. Thus, the last column of the above table, which gives the ratio of nitrogen contained in the solution as urea and nitrate-nitrogen to the nitrogen present as basic ammonia-nitrogen, shows that for Solutions (1) and (2) (solutions of urea and of calcium nitrate, respectively), this ratio is 0.33 and 0.23, respectively, whereas for Solution (3), which contains both urea and calcium nitrate, this ratio has been increased to 0.92 so that for a given addition of ammonia to a superphosphate, three to four times as much nitrogen in the form of amide and nitrate-nitrogen may be added by employing solutions of both urea and calcium nitrate as may be added when employing solutions of either urea or calcium nitrate alone. Again, for solutions in 50% aqua ammonia, Nos. (4) and (7) of the above table containing only calcium nitrate or urea, have a ratio of urea or nitrate-nitrogen to ammonia of 0.41 and 0.66, whereas for Solutions (5) and (6) which contain both urea and calcium nitrate, this ratio is increased to 0.95 and 1.39.

By employing a solution containing about 30% urea, 35% calcium nitrate (calculated as the anhydrous salt), 17.5% ammonia and 17.5% water (corresponding to Solution (6) of the table), a fertilizer manufacturer could add about 2.4 times as much nitrogen to superphosphate as he could for the same degree of ammoniation employing aqua or anhydrous ammonia containing no dissolved fertilizer salts.

Furthermore, by dissolving both urea and calcium nitrate in ammoniacal liquors the vapor pressures of the resulting liquid compositions are much lower than those of the ammonia liquors themselves. By dissolving both calcium nitrate and urea in an ammoniacal liquid which has vapor pressures materially above atmospheric at naturally prevailing temperatures, the vapor pressures of the liquid at these temperatures may be substantially lowered. A large variety of liquid compositions having vapor pressures of about atmospheric or lower may thus be prepared. The following table shows the vapor pressures of various compositions of urea, calcium nitrate, ammonia and water and of ammoniacal liquids containing no dissolved salts:

*Vapor pressures in the system Urea-Ca(NO$_3$)$_2$- NH$_3$-H$_2$O*

| Salting out temp. | Composition—Wt. % | | | | Vapor pressures- Atms. Abs. | |
|---|---|---|---|---|---|---|
| | Urea | Ca(NO$_3$)$_2$ | NH$_3$ | H$_2$O | 0° C. | 30° C. |
| −5° C | 26.1 | 38.6 | 26.8 | 8.5 | 0.75 | 2.60 (1) |
| | 0 | 0 | 100 | 0 | 4.24 | 11.51 (2) |
| | 0 | 0 | 76 | 24 | 3.05 | 8.40 (3) |
| 16° C | 20 | 48 | 16 | 16 | .14 | .55 (4) |
| | 0 | 0 | 50 | 50 | 1.15 | 3.60 (5) |

Solution (1) in the above table represents a solution which may be prepared by dissolving urea and $Ca(NO_3)_2.2H_2O$ in anhydrous ammonia or by dissolving urea and anhydrous calcium nitrate in 76% aqua ammonia.

The relatively large amounts of valuable fertilizer ingredients which are contained in the calcium nitrate-urea-ammonia compositions of this invention, their relatively low vapor pressures and their high ratios of urea and nitrate-nitrogen to basic ammoniacal nitrogen, make these compositions particularly valuable as a means for the transportation of their constituents and as a material for making up mixed fertilizers. They make possible, further, convenient and economical methods for the preparations of these nitrogenous materials for transportation.

Both the calcium nitrate and calcium nitrate-urea compositions of this invention may be readily transported in a transportable package comprising a container and the liquid composition. Due to the material lowering of the vapor pressures of ammoniacal liquids by dissolving therein calcium nitrate or both calcium nitrate and urea, the containers in which the liquids are shipped are not subjected to the relatively higher vapor pressures of the ammoniacal liquids themselves. In many cases relatively high vapor pressures of ammoniacal liquids at ordinary atmospheric temperatures which, without calcium nitrate or calcium nitrate and urea being present, are materially above atmospheric, may be lowered by dissolving in the ammoniacal liquid either calcium nitrate or both calcium nitrate and urea, to such an extent as to permit the liquid being transported and handled in low pressure containers, whereas an ammoniacal liquid of corresponding composition without these materials dissolved in it would require special equipment for its transportation. It is of advantage to dissolve in the ammoniacal liquids having vapor pressures materially above atmospheric pressure at ordinary temperatures, the calcium nitrate or both calcium nitrate and urea taken together in amount at least sufficient to lower the vapor pressure of the ammoniacal liquid to about atmospheric at ordinary atmospheric temperatures.

The calcium nitrate-ammonia solutions of this invention may be conveniently prepared, for example, by introducing ammonia as a gas or anhydrous liquid or as concentrated aqua ammonia into a solution or slurry of calcium nitrate or by dissolving solid calcium nitrate containing more or less water in liquid ammonia or in an aqua ammonia of suitable strength. These solutions may be particularly advantageously prepared from the liquid anhydrous ammonia or concentrated aqua ammonia liquors obtained from a synthetic ammonia process and the solutions of calcium nitrate obtained by reacting nitrogen oxides or nitric acid with calcium carbonate or milk of lime. If desired, gaseous or anhydrous liquid ammonia or concentrated aqua ammonia may be introduced into a solution of calcium nitrate thus obtained, or the calcium nitrate solution may be evaporated to drive off more or less of its water content before being treated with the ammonia. Again, the calcium nitrate solution may be concentrated to crystallize out solid calcium nitrate and the crystalline product, without special drying treatment, may be dissolved in liquid ammonia, aqua ammonia or used for the absorption of gaseous ammonia. Further, solutions of calcium nitrate in ammonia may be prepared by treating calcium compounds, such as rock phosphate, with nitrogen oxides or nitric acid to produce the corresponding acid or acidic calcium salts and calcium nitrate, which materials may be treated with ammonia and the ammoniacal solution of the calcium nitrate together with other soluble salts separated from the insoluble materials by filtration or other means.

The calcium nitrate-urea-ammonia solutions of this invention may be prepared, for example, by introducing urea into the solutions of calcium nitrate and ammonia prepared in any of the foregoing manners. Furthermore, compositions containing both calcium nitrate and urea, ammonia and, if desired, water may be prepared by mixing the desired proportions of the components, any one or more of which may contain proportions of the other components. Thus, the calcium nitrate may be anhydrous, may be hydrated or may be a moist solid or in solution in water. Aqueous solutions or slurries of calcium nitrate and/or urea may be used as, for example, by treating them with ammonia, either by adding liquid anhydrous ammonia or aqua ammonia to urea or by absorbing gaseous ammonia in the solutions or slurries of the other components. Furthermore, the calcium nitrate and urea may be first mixed together to form a composition which may approximate the product $Ca(NO_3)_2.4CO(NH_2)_2$ and this composition may then be dissolved in anhydrous liquid ammonia or aqua ammonia, or gaseous ammonia be absorbed in the composition to form a liquid. The urea-water compositions such as may be recovered from a urea synthesis system may be utilized in preparing the liquid compositions of this invention, thereby obviating the necessity of evaporating the water from this urea synthesis product.

This invention further permits of producing calcium nitrate in a marketable form by reaction of nitrogen oxides or nitric acid with basic calcium materials without necessitating a close control of the acidity of the product formed, such as is required where solid calcium nitrate is to be shipped, in order to obtain a non-acid product which will not attack the containers for the solid. Where the compositions of this invention are used for the transportation of the calcium nitrate, the solutions of calcium nitrate prepared by reaction of nitrogen oxides or nitric acid with basic materials may have any degree of acidity which may be desired from the standpoint of the formation of the calcium nitrate and any free acid in the solution of calcium nitrate is then neutralized by the ammonia used in making up the calcium nitrate-ammonia or calcium nitrate-urea-ammonia compositions. The ammonia reacting with the free nitric acid in the calcium nitrate forms ammonium nitrate which is a valuable fertilizer ingredient and hence the ammonia used for neutralization of the excess free acid, instead of representing a loss of material, is in a form in which it is a desirable addition to the fertilizer mixtures.

The production of the compositions of this invention is particularly adapted to the fixed nitrogen industry wherein ammonia, calcium nitrate and urea may all be produced in the same plant. These products may thus be shipped to the trade as a single homogeneous liquid.

The following examples are illustrative of methods for the preparation of the calcium nitrate-ammonia compositions of this invention and of the production of fertilizers employing calcium nitrate-ammonia solutions but the invention is not limited to these examples or to the particular details described. Whenever the word "parts" is used, it refers to parts by weight.

*Example I.*—A substantially anhydrous calcium nitrate-ammonia composition may be prepared by mixing about 85 parts of substantially anhydrous calcium nitrate with 100 parts of anhydrous liquid ammonia. This composition will not salt out at temperatures above about 0° C.

*Example II.*—A calcium nitrate-ammonia-water composition may be prepared by mixing about 100 parts of calcium nitrate di-hydrate $(Ca(NO_3)_2.2H_2O)$ with about 41 parts of anhydrous ammonia and 23 parts of water. The composition thus prepared will not salt out at temperatures above 0° C. At 30° C. the solution has a vapor pressure of about 1.1 atmospheres absolute which is equivalent to the vapor pressure of about a 30% aqua ammonia at 30° C. whereas the proportions of water and ammonia in the solution are equivalent to a 50% aqua ammonia.

The solutions of Examples I and II may be utilized for the production of a fertilizer by mixing the desired proportions of the solutions with superphosphate or triple superphosphate.

*Example III.*—A solution of calcium nitrate in water is evaporated until the composition contains about 9 parts of water for every 48 parts of calcium nitrate calculated as anhydrous $Ca(NO_3)_2$. At temperatures below about 51.3° C. the composition thus obtained will, if supercooling does not occur, completely solidify forming calcium nitrate di-hydrate. About 51 parts of this composition are then mixed with about 40 parts of anhydrous ammonia. Any precipitate of impurities from this solution may be filtered off, if desired. The solution thus obtained does not salt out at temperatures above about 5° C.

The above described calcium nitrate-ammonia-water composition may be used for the preparation of a fertilizer by mixing about 91 parts of the solution with a mixture containing the following ingredients:

| | Parts |
|---|---|
| Superphosphate (18% $P_2O_5$) | 890 |
| Ammonium sulfate | 190 |
| Potassium sulfate (50% $K_2O$) | 160 |
| Sand | 669 |

The resulting fertilizer mixture contains about 4% N, 8% $P_2O_5$ and 4% $K_2O$. The mixture is in good physical condition immediately after preparation and also after cooling. The mixture is not hygroscopic as is shown by the fact that it loses moisture when exposed at 30° C. to an atmosphere of 60% relative humidity.

*Example IV.*—A solution of about 77 parts of $Ca(NO_3)_2.4H_2O$ in about 40 parts of anhydrous ammonia and about 17 parts of water is prepared. This solution contains about 53.5 parts of calcium nitrate to 40 parts of ammonia to 40 parts of water. It is utilized for the preparation of a complete fertilizer mixture in the following manner. About 135 parts of the solution are sprayed onto a mixture containing the following ingredients:

| | Parts |
|---|---|
| Superphosphate (18% $P_2O_5$) | 890 |
| Ammonium sulfate | 181 |
| Potassium sulfate (50% $K_2O$) | 160 |
| Sand | 635 |

The resulting mixture is in good physical condition. It contains about 4% N, 8% $P_2O_5$ and 4% $K_2O$.

*Example V.*—A urea-calcium nitrate-ammonia water composition may be prepared by mixing about 51 parts of substantially dry urea with about 49 parts of liquid anhydrous dry urea with adding to 100 parts of the urea-ammonia mixture about 98 parts of hydrated calcium nitrate containing about 17½ parts of water. The above proportions of urea and liquid anhydrous ammonia would form at 4° C. a slurry containing about 35 parts of an undissolved urea-ammonia composition. After thorough mixing of all the ingredients of this composition, however, a solution is obtained which does not salt out at temperatures above about 4° C. At 30° C. the vapor pressure is about 2.5 atmospheres absolute which is about equal to the vapor pressure of 43% aqua ammonia at 30° C.

A composition similar to the above may be prepared by mixing about 98 parts of $Ca(NO_3)_2.2H_2O$ with about 49 parts of liquid anhydrous ammonia and about 51 parts of urea. A solution of hydrated calcium nitrate in liquid anhydrous ammonia in the above proportions would, unless super-cooling occurred, form a slurry at 4° C. in which the ratio of dissolved $Ca(NO_3)_2.2H_2O$ to ammonia in the liquid phase is about 68 to 49. After mixing in the urea a solution is obtained which does not salt out at temperatures above about 4° C. and contains dissolved $Ca(NO_3)_2.2H_2O$ to $NH_3$ in the ratio of about 68 to 34.

*Example VI.*—About 73 parts of a urea-water composition containing about 46 parts of urea and about 27 parts of water are mixed with about 27 parts of anhydrous ammonia. This mixture at 0° C. would form a slurry containing about 14½ parts of undissolved urea. About 54 parts of anhydrous calcium nitrate are thoroughly mixed with 100 parts of the foregoing urea-ammonia-water composition to form a solution which does not salt out at temperatures above about 0° C.

The solution thus formed has a vapor pressure at at 30° C. of about .7 atmospheres absolute which is substantially equal to the vapor pressure of about 25% aqua ammonia at 30° C.

*Example VII.*—An aqueous solution containing 120 parts of calcium nitrate is concentrated until it contains about 25 parts of water. Even at its boiling point of about 151° C. some anhydrous calcium nitrate will salt out. To the resulting slurry there is added about 65 parts of a urea-water composition containing about 50 parts of urea such as may be obtained from the synthesis of urea from ammonia and carbon dioxide. About 40 parts of anhydrous ammonia are then added to the 210 parts of urea-calcium nitrate-water mixture to form a solution which does not salt out at temperatures above about 16° C. The vapor pressure of this solution at 30° C. is about 0.9 atmospheres absolute equal to the vapor pressure of about 28% aqua ammonia at 30° C.

The above solution may be utilized for the preparation of a fertilizer by spraying about 250 parts of the foregoing solution upon a mixture of the following materials:

| | Parts |
|---|---|
| Superphosphate (18% $P_2O_5$) | 890 |
| Potassium sulfate (50% $K_2O$) | 160 |
| Ammonium sulfate | 15 |
| Sand | 685 |

The resulting mixture is in good physical condition immediately after ammoniation and also after cooling to ordinary temperatures. It contains about 4% N, 8% $P_2O_5$ and 4% $K_2O$.

*Example VIII.*—The following materials are mixed together:

| | Parts |
|---|---|
| Superphosphate | 890 |
| Muriate of potash | 160 |
| Ammonium sulfate | 95 |
| Inert filler | 707 |

This mixture is then sprayed while being agitated with about 148 parts of a solution prepared by dissolving about 69½ parts of $Ca(NO_3)_2.2H_2O$ and about 38½ parts of urea in 40 parts of liquid anhydrous ammonia. The product contains 4% N, 8% $P_2O_5$ and 4% $K_2O$.

The calcium nitrate-urea-ammonia-water composition utilized in preparing the above fertilizer is one which does not salt out at temperatures above about —5° C. Its vapor pressure is approximately equal to the vapor pressure of 43% aqua ammonia.

If desired, additional materials such as ammonium nitrate, ammonium chloride, sodium nitrate, potassium nitrate, etc. or any two or more of these materials, which in themselves are valuable fertilizers, may be incorporated with the calcium nitrate-ammonia or the calcium nitrate-urea-ammonia solutions before they are added to the phosphate material, or they may be incorporated with the phosphate material before or after the treatment with the calcium nitrate-ammonia liquor. It it is desired to include in the fertilizer mixture salts such as ammonium phosphate, ammonium sulfate, etc., which form a precipitate with calcium nitrate, it is preferable to add these materials to the super-phosphate either before or after the addition of the calcium nitrate-containing solutions of this invention rather than to the solutions themselves.

When in this specification and in the claims reference is made to a solution or liquid saturated with calcium nitrate and/or urea at a given temperature, it is intended to refer to a solution or liquid containing calcium nitrate and/or urea in amount such that upon cooling to a lower temperature, if the formation of a supersaturated solution does not occur, a solid material containing calcium nitrate and/or urea separates from the solution. Such solid material may contain either or both of these substances in the form of complex reaction products of two or more constituents of the solution or liquid.

We claim:

1. As a new composition of matter, a liquid comprising urea, calcium nitrate and a substantial proportion of ammonia, said liquid containing an amount of at least one of said urea and calcium nitrate dissolved therein in excess of that necessary for saturation of the liquid in the absence of the other.

2. As a new composition of matter, a solution of both urea and calcium nitrate in an ammoniacal liquor containing a substantial proportion of ammonia, said solution being substantially saturated with at least one of said urea and calcium nitrate at a temperature between about −30° C. and 30° C.

3. As a new composition of matter, a substantially anhydrous solution of urea and calcium nitrate in ammonia, said solution containing an amount of at least one of said urea and calcium nitrate dissolved therein in excess of that necessary for saturation of the solution in the absence of the other.

4. A process for the preparation for transportation of urea and ammonia which comprises dissolving urea and calcium nitrate in anhydrous liquid ammonia in amount sufficient to form a solution substantially saturated with at least one of said urea and calcium nitrate.

5. A process for the preparation for transportation of urea and ammonia which comprises dissolving both urea and calcium nitrate in an ammoniacal liquor containing a substantial proportion of ammonia, said materials being employed in proportions such that the resulting liquid composition contains an amount of at least one of said urea and calcium nitrate in excess of that necessary for saturation of the ammoniacal liquid in the absence of the other.

6. A process for producing a fertilizer which comprises treating a solid acidic fertilizer material with a solution of calcium nitrate and urea in an ammoniacal liquid containing a substantial proportion of ammonia, said solution containing an amount of at least one of the said calcium nitrate and urea dissolved therein in excess of that necessary for saturation of the ammoniacal liquid in the absence of the other.

7. A process for producing a fertilizer which comprises treating a monocalcium phosphate material with a solution of calcium nitrate and urea in an ammoniacal liquid containing a substantial proportion of ammonia, said solution prior to addition to said phosphate material being substantially saturated with at least one of said urea and calcium nitrate at a temperature between about −30° C. and 30° C.

8. A process for producing a fertilizer which comprises treating a superphosphate material with a solution of calcium nitrate and urea in an ammoniacal liquid containing a substantial proportion of ammonia, said solution containing an amount of at least one of the said calcium nitrate and urea dissolved therein in excess of that necessary for saturation of the ammoniacal liquid in the absence of the other.

WALTER H. KNISKERN.
LEONARD V. ROHNER.

CERTIFICATE OF CORRECTION.

Patent No. 2,022,675.  December 3, 1935.

WALTER H. KNISKERN, ET AL.

It is hereby certified that error appears in the printed specification of the above numbered patent requiring correction as follows: Page 4, second column, line 53, after "above" insert about; and line 65, for the numeral "48" read 42; page 5, first column, line 39, for the words "dry urea with" read ammonia and; page 5, second column, line 64, for "It" read If; and that the said Letters Patent should be read with these corrections therein that the same may conform to the record of the case in the Patent Office.

Signed and sealed this 4th day of February, A. D. 1936.

Leslie Frazer (Seal)  Acting Commissioner of Patents.